Sept. 6, 1966 B. HOPPER 3,271,759

ANALOG TO DIGITAL CONVERTER

Filed Sept. 13, 1963 4 Sheets-Sheet 1

INVENTOR.
BILL HOPPER
BY McLaughlin & Cahill
ATTORNEYS

INVENTOR.
BILL HOPPER

BY McLaughlin & Cahill

ATTORNEYS

INVENTOR.
BILL HOPPER
BY McLaughlin & Cahill
ATTORNEYS

Sept. 6, 1966 B. HOPPER 3,271,759

ANALOG TO DIGITAL CONVERTER

Filed Sept. 13, 1963 4 Sheets-Sheet 4

INVENTOR.
BILL HOPPER
BY McLaughlin & Cahill
ATTORNEYS

United States Patent Office 3,271,759

Patented Sept. 6, 1966

3,271,759
ANALOG TO DIGITAL CONVERTER

Bill Hopper, Phoenix, Ariz., assignor to Dynamic System Electronics Corp.

Filed Sept. 13, 1963, Ser. No. 308,705
4 Claims. (Cl. 340—347)

The present invention pertains to analog-to-digital converters, and more particularly, to apparatus for converting an analog voltage into a digital representation of the amplitude thereof.

The transformation of an analog voltage into a digital quantity may be accomplished by successively sampling the analog quantity to determine if it exceeds a predetermined reference level. If the analog quantity exceeds the reference level, a second reference is compared to the analog quantity. The successive comparisons, and the subsequent indications resulting therefrom are known as serial conversion of analog quantities to digital representation. The iterative process by the utilization of an algorithm results in a substantial time lag between sampling of the analog quantity and the ultimate production of its digital counterpart. The conversion is considerably speeded by the utilization of parallel conversions; that is, the simultaneous generation of the digital counterpart of the analog quantity; for example, the generation of the binary coded number 1000 in response to the analog quantity having a relative decimal amplitude of 8 may be considered parallel conversion if each of the binary digits are produced simultaneously upon the sampling of the analog quantity.

One of the prime difficulties with parallel conversion into a binary coded digital representation is the fact that a slight variation in the analog quantity may result in a complete change in the binary digital representation; for example, a relative change in the analog quantity from a decimal 7 to a decimal 8 would result in a change in the binary digital notation 0111 to 1000. A sampling of the binary equivalent of the analog quantity as it changes from 7 to 8 would result in a binary notation having little or no relation to the actual analog amplitude. To overcome this difficulty of ambiguity, it has been proposed to utilize the reflected binary or Gray code in which each succeeding value of the code differs from the preceding value and the succeeding value in only one bit location. Analog to digital converters of the prior art for implementing a Gray code counterpart of an analog quantity usually take the form of a shaft encoder; whereas, all electronic converters of the prior art provide a coded binary output that usually includes weighted positions within the code and must rely on these weighted positions to provide logical circuit operation. Thus, electronic converters of the prior art are unable to yield a code, such as the Gray code, that does not include weighted positions.

Accordingly, it is an object of the present invention to provide an analog to digital converter that provides a non-weighted digital coded output in response to an analog input.

It is another object of the present invention to provide an all electronic converter capable of providing a reflected binary output code in response to an analog voltage input.

It is still another object of the present invention to provide a digital to analog converter capable of providing a parallel reflected binary coded output in response to an analog voltage input.

It is still another object of the present invention to provide an analog to digital converter utilizing conventional operational amplifiers, and other conventional circuits in arrangement for obtaining a non-weighted digital output in response to an analog input.

Further objects and advantages of the present invention will become apparent to those skilled in the art as the description thereof proceeds.

Briefly, in accordance with one embodiment of the invention, a plurality of operational amplifiers are provided, each representing a reflected binary digit. Each of the operational amplifiers is connected in a conventional summing configuration. The analog voltage, to be converted to digital representation, is simultaneously applied to the input of all of the amplifiers. The output of each of the amplifiers is connected to the input of all other amplifiers representing a less significant digit. Each of the amplifiers is provided with a pair of feedback circuits, each intended for use with a particular polarity of the amplifier output. In the embodiment chosen for illustration, the negative output of each of the amplifiers is utilized in the "feed forward" arrangement indicated above where the output is connected to the input of amplifiers representing a less significant digit. The normal, or non-polarized, output of the amplifiers is applied to a threshhold amplifier or to a zero cross-over amplifier such as a Schmitt trigger. Therefore, by a simple weighting of resistors, the amplifiers will provide outputs having a polarity indicative of the chosen binary code which, when properly detected by the cross-over amplifier, provides an inverted binary coded output representative of the amplitude of the analog quantities applied to all of the amplifiers.

The present invention may more readily be described by reference to the accompanying drawings in which.

Figure 1:
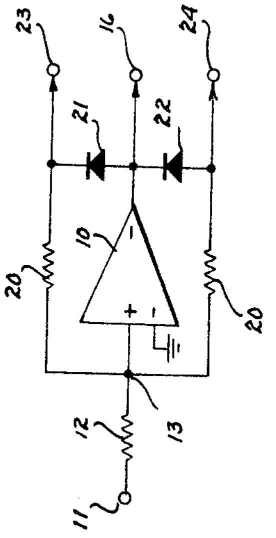
FIG. 1 is a schematic representation of a typical operation of an amplifier connected to form a summing amplifier and utilizing positive and negative feedback paths for use in the apparatus of the present invention.

Referring to FIG. 1, a conventional operational amplifier 10, shown in the usual schematic form, is provided with input terminal 11 and input resistor 12 connected to the amplifier through a summing point 13. The output of the amplifier which, with normal operational amplifier configurations will be inverted relative to the input, is connected to an output terminal 16. Two feedback paths are provided, each corresponding to a feedback current of a given polarity; the appropriate feedback path being chosen by steering diodes 21 and 22. Feedback resistances 20 are identical. The positive output, prevailing at terminal 23, is not used in the system of the present invention; the negative output, at terminal 24 is used to connect the signal provided by the amplifier to other amplifiers representing less significant digits. The amplifier of FIG. 1 may readily be recognized as a summing amplifier (assuming open loop gain greater than 10,000), wherein the closed loop gain is proportional to the ratio of the resistances $R_{\text{feedback}}/R_{\text{input}}$ or $R_{20}/R_{12}$.

Figure 2:
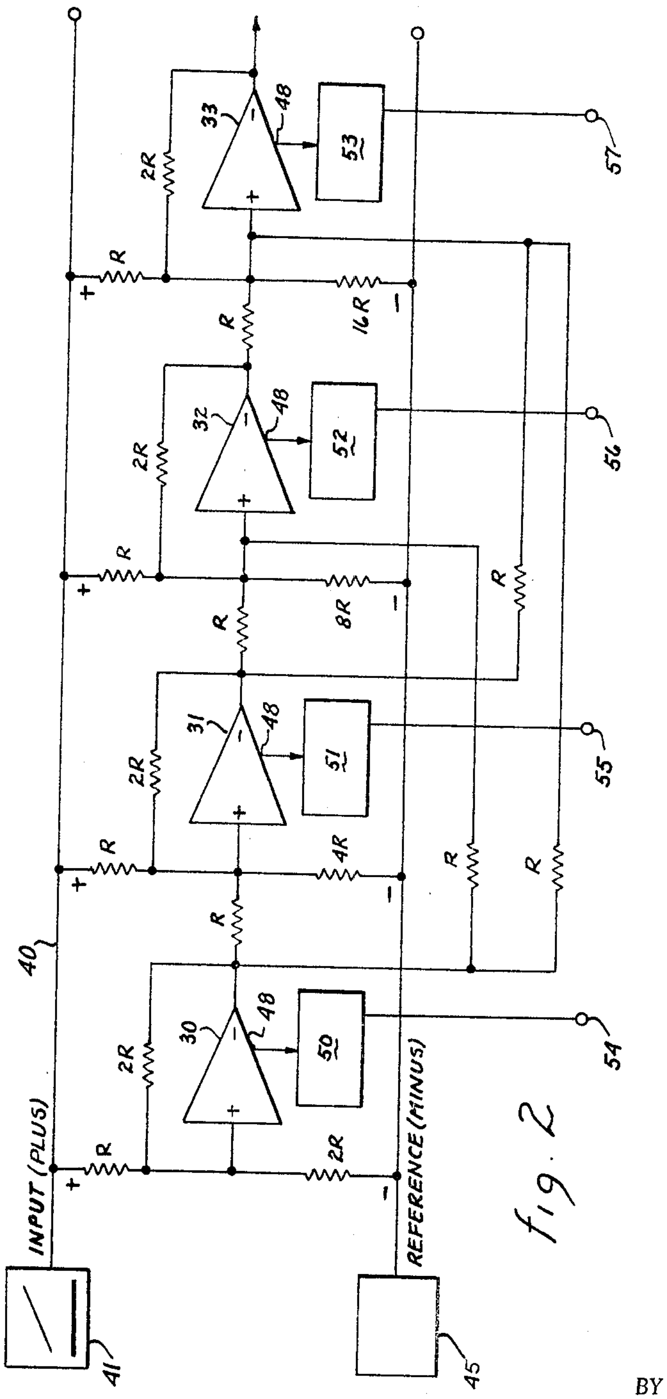
FIG. 2 is a block diagram of an analog to digital converter constructed in accordance with the teachings of the present invention.

Referring to FIG. 2, the summing amplifiers 30–33 shown therein are indicated as having a single feedback path; however, it will be understood that the single feedback path is illustrated merely to simplify the description of the present invention and each amplifier, in fact, has two feedback paths with steering diodes as described in connection with FIG. 1. In FIG. 2, a plurality of amplifiers are shown, each connected through a resistance R to an analog voltage provided by analog input line 40 connected to a source of analog voltage 41. In the illustration shown in FIG. 2, only four amplifiers are used since, for purposes of illustration, it is thought sufficient that only four digits of an inverted binary code need be illustrated.

Each amplifier is also connected to a reference voltage source 45 through a resistance that varies, depending upon the particular amplifier, from 2R to 16R. The output of the first amplifier 30 is connected through a resistance R to the input of each of the remaining amplifiers. Similarly, the output of the second amplifier 31 is connected to the input of the third and fourth amplifiers 32 and 33 through a resistance R; the output of the third amplifier 32 is connected through a resistance R to the input of the fourth amplifier 33. Thus, if we allocate the first amplifier as representative of the most significant digit of the code, and the second amplifier as representative of the next most significant digit and so forth until the fourth amplifier is indicative of the least significant digit, it may be seen that each amplifier is connected through a resistance R to the input of each succeeding amplifier representing a less significant digit. The outputs indicated in FIG. 2 as connected to the inputs of other amplifiers correspond to the output terminal 24 shown in the amplifier of FIG. 1. The terminal corresponding to terminal 16 in the amplifier of FIG. 1 is shown in FIG. 2 at 48 and is connected, in each instance, to a cross-over detector or open loop amplifier 50 through 53. Each cross-over detector, which may take any of several well-known forms such as a Schmitt trigger, provides an output to a corresponding terminal 54 through 57 when the input signal applied thereto from the corresponding summing amplifier is negative. Thus, the summing amplifier must be provided with a net positive input voltage to provide a negative output voltage to the corresponding cross-over detector. Therefore, the output terminals of the system 54 through 57 represent four digits of a four bit reflected binary code each bit of which will assume either a 1 or a 0 depending on the output of the cross-over detector which, in turn, depends upon the polarity of the output of the corresponding summing amplifier. The actual value of the resistances in the system of FIG. 2 will vary in accordance with the voltages present throughout the system as well as other factors peculiar to the particular application in which the system is to be used; however, the relative values of the resistances illustrated in FIGS. 2 and 4 may be mathematically shown to provide the desired amplifier outputs:

Assume:

(a) all amplifiers are conventional operational amplifiers having a gain in excess of 10,000

(b) all input resistances$=R$ (c) all feedback resistances$=2R$ then let the first reference resistance$=2R$, the voltage at the summing point of the first amplifier is then $V_{1\ (\mathrm{in})}=2V_i-V_R$ (see, for example, Electronic Analog Computers, Korn and Korn, McGraw-Hill)

where $V_i$=analog input voltage, and $V_R$=reference voltage since we are only using negative outputs, and since each amplifier inverts the input voltage applied thereto $$V_{1\ (\mathrm{out})}=0 \text{ when } 0<V_i<V_{R/2}$$
$$=(\text{negative quantity}) \text{ when } V_{R/2}<V_i<V_R$$

Using the same assumptions given above, and letting the second reference resistance $=4R$, the voltage at the summing point of the second amplifier equals $$V_2\ (\mathrm{in})=2V_i-V_{R/2}+\Big[_{V_i=V_{R/2}}^{V_i=V_R}-2(2V_i-V_R)$$

then $$V_{2\ (\mathrm{out})}=0 \text{ when } 0<V_i<V_{R/4}$$
$$=(\text{negative quantity}) \text{ when } V_{R/4}<V_i<3V_{R/4}$$
$$=0 \text{ when } 3V_{R/4}<V_i<V_R$$

Figure 3:
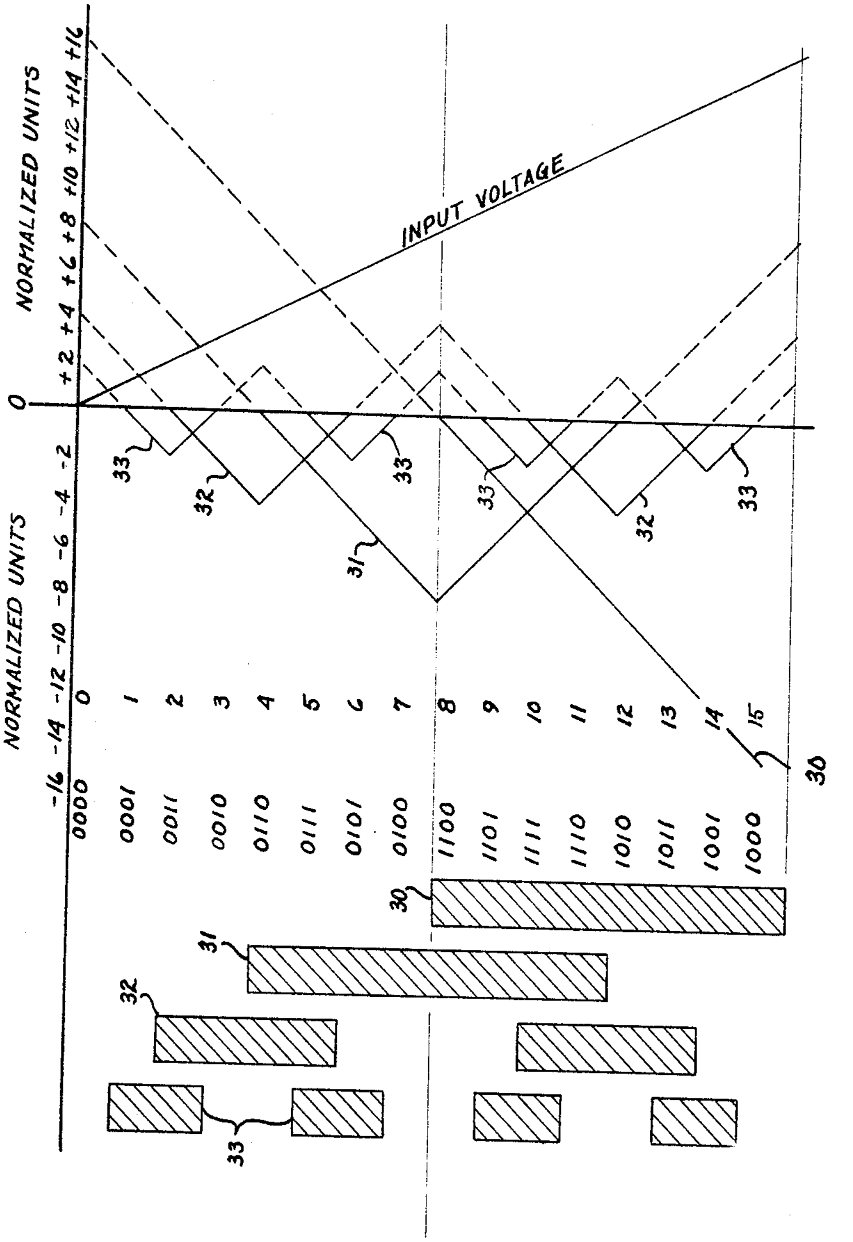
FIG. 3 is a response curve and corresponding bar chart showing the outputs from the various amplifiers and the digital interpretation of those outputs after detection thereof by the zero cross-over amplifiers.
Figure 5:
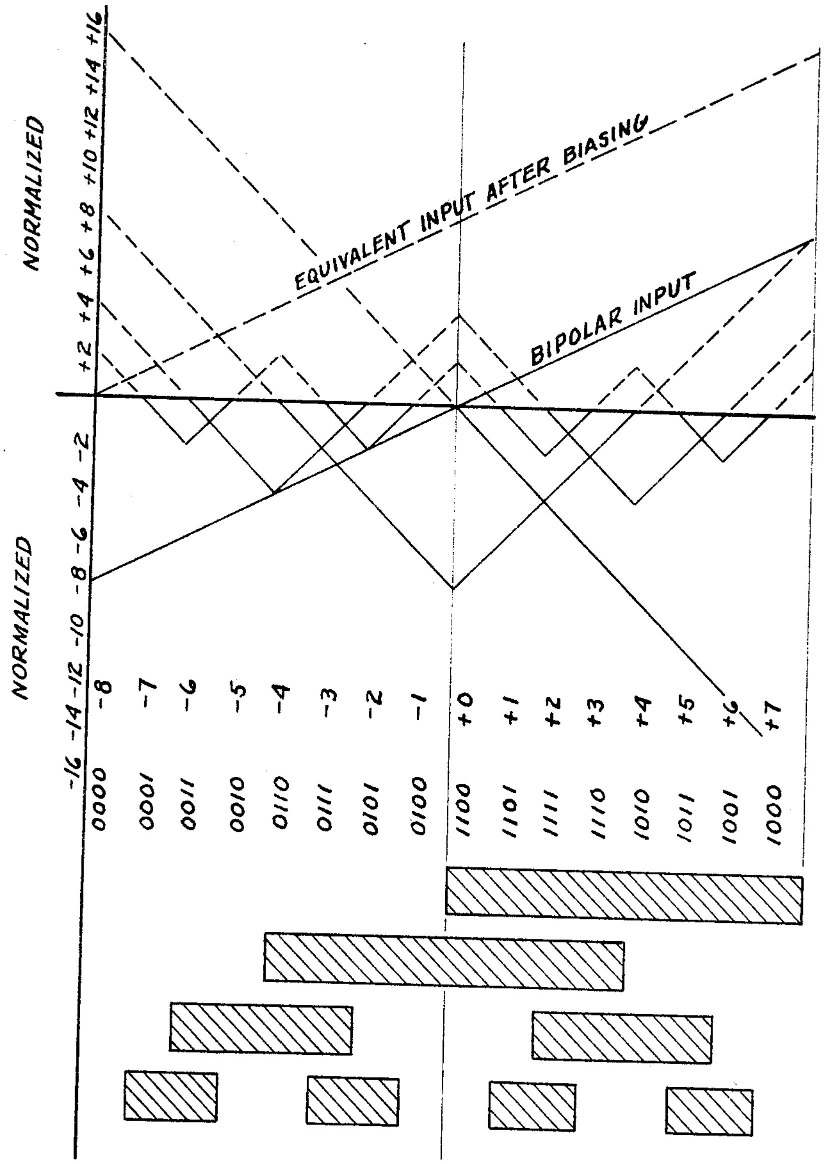
FIG. 5 is a response curve and corresponding bar chart of the output of the modification shown in FIG. 4.

The output provided by the remaining two amplifiers may similarly be analized, the results of which are graphically illustrated in FIGS. 3 and 5. The significance of the respective amplifier outputs will become apparent as the description of the operation is given.

The operation of the system of FIG. 2 may best de described by reference to FIG. 3. Referring to FIG. 3, a linearly increasing analog input voltage is shown in normalized units indicative of a steadily increasing analog quantity. As the input voltage increases, the output of each respective amplifier is shown and, as indicated in FIG. 3, it may be seen that the outputs of the corresponding amplifiers change from positive to negative polarity. Since the cross-over networks, in the embodiment chosen for illustration, are provided to detect only negative outputs from the corresponding summing amplifiers, only the bottom portion (negative portion) of each response curve of each amplifier is shown in solid lines. Thus, as the input voltage increases from a relative value to zero to the relative value of one, the amplifier 33 will experience a shift in the polarity of the output signal provided thereby and the cross-over detector 53 connected to amplifier 33 will provide a digital output signal indicative of a binary bit in that position. Thus, output terminal 57 will provide a voltage indicating the presence of a binary 1 whereas, the remainder of the output terminals 54 through 56 will indicate the presence of binary 0, or the absence of a binary 1. The amplifier 33 switches output polarity from positive to negative as indicated by the curve in FIG. 3, and it may be seen that each time the curve enters the negative portion of the response curve of FIG. 3 the bar chart to the left of the curve reveals the existance of a binary digit 1 at terminal 57. Similarly, each of the other amplifiers experiences a change in the polarity of the output thereof and, when the output is a negative quantity, the corresponding cross-over detector generates a voltage at the corresponding output terminal to indicate the presence of a binary 1. Following the values assigned to the specific combination of output values, it may be seen from the bar chart that the amplifiers shown in FIG. 2 will change output polarities in accordance with the reflected binary code. Thus, a rapidly changing input voltage will only change one bit of the binary code at a time and any readout occurring at the time of a bit change will have a possible error no greater than the incremental value of that bit.

Figure 4:
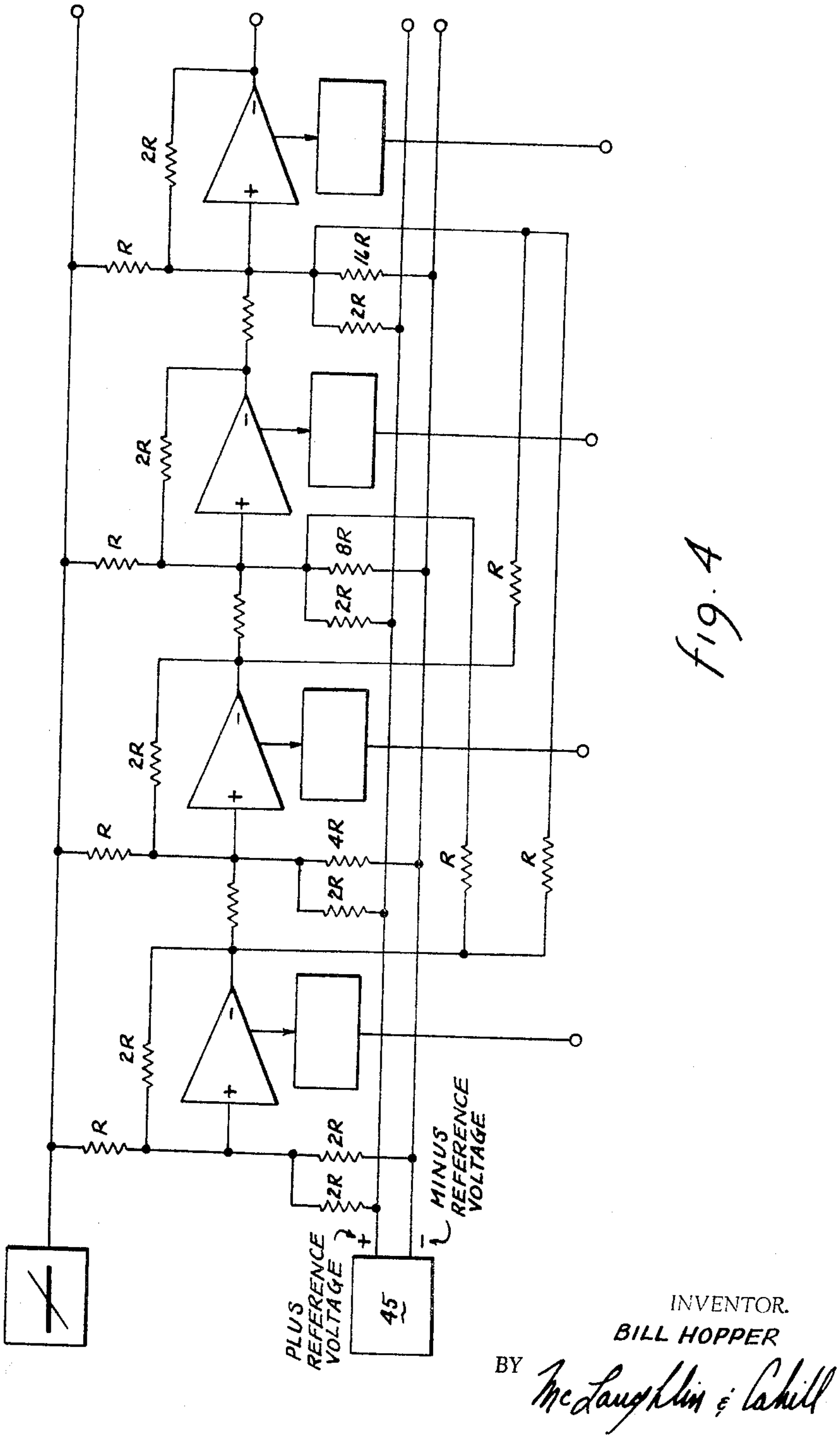
FIG. 4 is a modification of the analog to digital converter of FIG. 2 adapted for bipolar quantities.

The analog to digital converter system shown in FIG. 2 is intended for use with a unipolar analog input quantity; however, it may be necessary under certain circumstances to provide digital conversion for a bipolar analog quantity. Thus, the configuration shown in FIG. 4 may be utilized in lieu of that shown in FIG. 2. Referring to FIG. 4 it may be seen that the system configu-Referring to FIG. 4 it may be seen that the system configuration is identical with the exception that the reference voltage source 45 provides both positive and negative reference voltage levels and that each voltage level is connected to the summing point of each of the summing amplifiers. It may also be seen that the positive voltage resistor having a relative value of 2R; whereas, the negative or minus voltage reference is connected to the summing point through resistors having relative values identical to the relative values connecting the reference voltage of FIG. 2 to the corresponding summing points. The operation of the system of FIG. 4 is identical to that of FIG. 2 with the exception that the input curve will be shifted. Referring to FIG. 5 it may be seen that the analog input voltage is a bipolar voltage indicated in FIG. 5 as beginning at a normalized value of −8 and rising through zero to a +8. The equivalent input to each of the corresponding summing amplifiers after biasing the summing point at the input of each of the amplifiers by the application of the positive voltage reference through 2R resistor is shown in dotted lines in FIG. 5 above the bipolar input curve. The relative values assigned to the respective binary code are also shifted, and instead of indicating the decimal equivalents of 0 through 15 now become equivalent to the decimal values of −8 through +7. The switching of each of the summing amplifiers from a positive to a negative output, and the "feed forward" of the output of the corresponding amplifiers is identical with that of FIG. 2.

The circuits utilized for the cross-over networks and for the operational or summing amplifiers of the present invention may take any convenient form. Hundreds of operational amplifiers have been designed to meet specific requirements of environment, frequency, drift, etc. Any of these conventional circuits may be utilized in the system of the present invention and the tolerances imposed on these amplifiers may be chosen to give equivalent tolerances in the system of the present invention. That is, if the system of the present invention is intended to be used in extreme environmental surroundings, amplifiers and cross-over detectors of present design may be chosen to meet these environmental requirements. Another very important advantage of the system of the present invention is the efficient use of amplifier capacity. Assuming the amplifiers have a fixed gain-bandwidth product, the gain of the least significant bit amplifier may be sacrificed to obtain greater bandwidth. This ability to use amplifier capacity enables the amplifier to closely follow the analog quantity and rapidly adjust to input conditions since great accuracy is not required in the least significant bit position. Similarly, the amplifier in the most significant bit position may sacrifice bandwidth (it will not be "switched" from one binary condition to another as often as the remaining amplifiers) for greater gain since accuracy becomes more important as the significance of the bit represented by the amplifier increases. Thus, a single conventional operational amplifier design may be used in the system of the present invention to provide amplifier capacity that would normally require several designs or one very expensive design.

It will therefore be obvious to those skilled in the art that many modifications may be made in the embodiments chosen for illustration without departing from the spirit and scope of the present invention. Accordingly, it is intended that the present invention be limited only by the scope of the appended claims.

I claim:

1. In an analog to digital converter comprising: a plurality of summing amplifiers each representing a binary digit of a reflected binary code and each including an input, an output, and a feedback path; means connecting an analog voltage, to be converted to digital representation, to the input of each of said amplifiers; means connecting the feedback path of each amplifier to the input of all other amplifiers representing a less significant digit; and a plurality of zero cross-over detectors, each connected to the output of one of said amplifiers respectively, for providing an indication of polarity of the output signal provided by the corresponding amplifier, and thus the digital value of the output of the corresponding amplifiers.

2. An analog to digital converter comprising: a plurality of summing amplifiers each representing a binary digit of a reflected binary code and each including an input, an output, and a feedback path; means connecting the input of each amplifier to an analog voltage through a given impedance; means connecting the input of the amplifier representing the most significant digit to a reference voltage through an impedance equal to twice said given impedance; means connecting the input of each succeeding amplifier, representing successively less significant digits, to said reference voltage through an impedance equal to twice the impedance connecting the preceding amplifier to said reference voltage; means connecting the feedback path of each amplifier to the input of all other amplifiers representing a less significant digit through an impedance equal to said given impedance; and a plurality of zero cross-over detectors, each connected to the output of one of said amplifiers respectively, for providing an indication of the polarity of the output signal provided by the corresponding amplifier, and thus the digital value, of the output of the corresponding amplifier.

3. An anlog to digital converter for generating a reflected binary code in response to an analog input comprising: a plurality of summing amplifiers each corresponding to a binary digit of a reflected binary code and each having a positive and a negative feedback path, an input, and an output; one of said feedback paths of each amplifier connected to the input of each remaining amplifier representing a less significant digit; means connecting the output of each amplifier to a cross-over detector to yield a voltage corresponding to the binary value of the output of said amplifier; means connecting an analog voltage source to the input of each of said summing amplifiers; and means including a plurality of resistors connecting a reference voltage source to the input of each of said amplifiers.

4. The analog to digital converter set forth in claim 3 wherein said one of said feedback paths is said negative feedback path.

References Cited by the Examiner

UNITED STATES PATENTS

| | | | |
|---|---|---|---|
| 3,100,298 | 8/1963 | Fluhr | 340—347 |
| 3,161,868 | 12/1964 | Waldhauer | 340—347 |
| 3,182,303 | 5/1965 | Howe | 340—347 |
| 3,188,624 | 6/1965 | McMillian | 340—347 |

MAYNARD R. WILBUR, *Primary Examiner.*

DARYL W. COOK, *Examiner.*

K. R. STEVENS, *Assistant Examiner.*